United States Patent
Conway et al.

(10) Patent No.: US 11,299,972 B2
(45) Date of Patent: Apr. 12, 2022

(54) METHOD FOR REMEDIATION OF SUBTERRANEAN-FORMED METAL-POLYMER COMPLEXES USING PERACETIC ACID

(71) Applicant: Flex-Chem Holding Company, LLC, Weatherford, OK (US)

(72) Inventors: Andrew Bryce Conway, Weatherford, OK (US); Scott Bailey, Round Rock, TX (US)

(73) Assignee: Flex-Chem Holding Company, LLC, Weatherford, OK (US)

( * ) Notice: Subject to any disclaimer, the term of this patent is extended or adjusted under 35 U.S.C. 154(b) by 0 days.

(21) Appl. No.: 17/066,993

(22) Filed: Oct. 9, 2020

(65) Prior Publication Data

US 2021/0108496 A1 Apr. 15, 2021

Related U.S. Application Data

(60) Provisional application No. 62/913,635, filed on Oct. 10, 2019.

(51) Int. Cl.
*E21B 43/27* (2006.01)
*C09K 8/524* (2006.01)
*E21B 47/06* (2012.01)

(52) U.S. Cl.
CPC .............. *E21B 43/27* (2020.05); *C09K 8/524* (2013.01); *E21B 47/06* (2013.01)

(58) Field of Classification Search
CPC .......... E21B 43/27; E21B 47/06; C09K 8/524
See application file for complete search history.

(56) References Cited

U.S. PATENT DOCUMENTS

| 3,700,280 A | 10/1972 | Papadopolous et al. |
| 4,089,787 A | 5/1978 | Lybarger et al. |

(Continued)

FOREIGN PATENT DOCUMENTS

| EP | 0326720 A1 | 8/1989 |
| EP | 0505169 A1 | 9/1992 |

(Continued)

OTHER PUBLICATIONS

Rick McCurdy, High Rate Hydraulic Fracturing Additives in Non-Marcellus Unconventional Shales, May 2011, pp. 17-21, Proceedings of the Technical Workshops for the Hydraulic Fracturing Study: Chemical & Analytical Methods http://water.epa.gov/type/groundwater/uic/class2/hydraulicfracturing/upload/proceedingsofhfchemanalmethodsfinalmay2011.pdf.

(Continued)

*Primary Examiner* — Silvana C Runyan
(74) *Attorney, Agent, or Firm* — Melissa M. Hayworth; George C. Lewis; Merchant & Gould PC

(57) ABSTRACT

This disclosure describes methods for remediating subterranean-formed metal-polymer complexes in wells in subterranean formations. In particular, these methods utilize a peracetic acid remediation mixture. The peracetic acid remediation mixture is injected into a subterranean formation adjacent to a well at a pressure below the fracture pressure of the formation. A sufficient contact time is allowed and then the peracetic acid remediation mixture is pumped from the subsurface. This has been shown to degrade, and thus remediate, polymer-containing, subterranean-formed metal-polymer complexes in shale formations.

20 Claims, 5 Drawing Sheets

(56) References Cited

U.S. PATENT DOCUMENTS

| | | | |
|---|---|---|---|
| 4,609,475 A | 9/1986 | Hanlon | |
| 4,815,537 A | 3/1989 | Jones | |
| 4,986,356 A | 1/1991 | Lockhardt et al. | |
| 5,038,864 A | 8/1991 | Dunleavy | |
| 5,223,159 A | 6/1993 | Smith et al. | |
| 5,224,546 A | 7/1993 | Smith et al. | |
| 5,346,010 A | 9/1994 | Adams et al. | |
| 5,497,830 A | 3/1996 | Boles | |
| 5,678,632 A | 10/1997 | Moses | |
| 5,944,446 A | 8/1999 | Hocking | |
| 6,110,875 A | 8/2000 | Tjon-Joe-Pin | |
| 6,162,766 A | 12/2000 | Muir | |
| 6,225,262 B1 | 5/2001 | Irwin | |
| 6,265,355 B1 | 7/2001 | Lai et al. | |
| 6,331,513 B1 | 12/2001 | Zaid et al. | |
| 6,435,277 B1 | 8/2002 | Qu et al. | |
| 6,436,880 B1 | 8/2002 | Frenier | |
| 6,527,051 B1 | 3/2003 | Reddy et al. | |
| 6,569,814 B1 | 5/2003 | Brady et al. | |
| 6,638,896 B1 | 10/2003 | Tibbles et al. | |
| 7,013,974 B2 | 3/2006 | Hanes, Jr. | |
| 7,159,658 B2 | 1/2007 | Frost et al. | |
| 7,192,908 B2 | 3/2007 | Frenier et al. | |
| 7,208,529 B2 | 4/2007 | Crews | |
| 7,306,041 B2 | 12/2007 | Milne et al. | |
| 7,527,103 B2 | 5/2009 | Huang et al. | |
| 7,906,463 B2 | 3/2011 | Starkey, II et al. | |
| 7,928,040 B2 | 4/2011 | Sanders et al. | |
| 8,071,511 B2 | 12/2011 | Welton et al. | |
| 8,236,734 B1 | 8/2012 | Shen | |
| 8,312,929 B2 | 11/2012 | Frenier et al. | |
| 8,567,503 B2 | 10/2013 | Welton et al. | |
| 8,567,504 B2 | 10/2013 | Welton et al. | |
| 8,584,757 B2 | 11/2013 | Reyes | |
| 9,932,516 B2 | 4/2018 | Conway | |
| 9,944,843 B2 | 4/2018 | Conway | |
| 10,202,834 B2 | 2/2019 | Conway | |
| 10,633,575 B2 | 4/2020 | Conway | |
| 10,697,282 B2 | 6/2020 | Conway | |
| 2002/0160920 A1 | 10/2002 | Dawson et al. | |
| 2005/0150520 A1 | 7/2005 | Gill et al. | |
| 2006/0124302 A1 | 6/2006 | Gupta et al. | |
| 2006/0142166 A1 | 6/2006 | Thomas | |
| 2007/0163779 A1 | 7/2007 | Rae et al. | |
| 2008/0110621 A1 | 5/2008 | Montgomery | |
| 2009/0298721 A1 | 12/2009 | Robb et al. | |
| 2010/0140186 A1* | 6/2010 | Huang | C02F 1/722 210/759 |
| 2010/0222242 A1* | 9/2010 | Huang | C09K 8/685 507/211 |
| 2010/0276152 A1 | 11/2010 | De Wolf et al. | |
| 2010/0294498 A1 | 11/2010 | Svoboda et al. | |
| 2011/0053811 A1 | 3/2011 | Horton et al. | |
| 2011/0214862 A1 | 9/2011 | Horton | |
| 2011/0237470 A1 | 9/2011 | Li et al. | |
| 2011/0263466 A1 | 10/2011 | Rose | |
| 2012/0125626 A1 | 5/2012 | Constantine | |
| 2013/0157905 A1 | 6/2013 | Saini | |
| 2013/0210684 A1 | 8/2013 | Ballard | |
| 2013/0213657 A1 | 8/2013 | Dobson, Jr. et al. | |
| 2013/0261032 A1 | 10/2013 | Ladva et al. | |
| 2013/0269936 A1 | 10/2013 | Reyes et al. | |
| 2013/0269941 A1 | 10/2013 | Reyes et al. | |
| 2013/0269944 A1 | 10/2013 | Reyes et al. | |
| 2013/0274154 A1 | 10/2013 | Nasr-El-Din et al. | |
| 2013/0274155 A1 | 10/2013 | Nasr-El-Din et al. | |
| 2013/0303412 A1 | 11/2013 | Luyster et al. | |
| 2014/0116696 A1 | 5/2014 | Reyes | |
| 2014/0116710 A1 | 5/2014 | Naser-El-Din | |
| 2014/0124205 A1 | 5/2014 | Nasr-El-Din et al. | |
| 2014/0151042 A1 | 6/2014 | Faugerstrom et al. | |
| 2015/0005204 A1 | 1/2015 | Alwattari | |
| 2016/0009985 A1 | 1/2016 | Brennan et al. | |
| 2016/0068741 A1* | 3/2016 | Talley | C11D 3/08 510/188 |
| 2017/0210969 A1 | 7/2017 | Pisanova et al. | |
| 2019/0120037 A1 | 4/2019 | Conway | |
| 2020/0224082 A1 | 7/2020 | Conway | |

FOREIGN PATENT DOCUMENTS

| | | |
|---|---|---|
| EP | 0599474 A2 | 6/1994 |
| WO | 2008090316 A1 | 7/2008 |
| WO | 2009086954 A1 | 7/2009 |
| WO | 2009091652 A2 | 7/2009 |
| WO | 2012116032 A1 | 8/2012 |
| WO | 2012171857 A1 | 12/2012 |
| WO | 2013019188 A1 | 2/2013 |
| WO | 2013081609 A1 | 6/2013 |
| WO | 2013173634 A1 | 11/2013 |
| WO | 2016074949 A1 | 5/2016 |

OTHER PUBLICATIONS

Al-Harthy, et al., Options for High Temperature Well Stimulation, Dec. 1, 2008, Oilfield Review Winter 2008/2009; 20, No. 4, http://www.slb.com/~/media/Files/resources/oilfield_review/ors08/win08/options_for_high_temperature_well_stimulation.pdf.

Portier, et al., Review on Chemical Stimulation Techniques in Oil Industry and Applications to Geothermal Systems—Technical Report, Deep Heat Mining Association, Work Package 4, May 2007, http://engine.brgm.fr/Deliverables/Period2/ENGINE_D28_WP4_ChemicalStimulation_DHMA_052007.pdf.

Xu, et al., On modeling of chemical stimulation of enhanced geothermal system using high pH with chelating agent, Geofluids; Journal vol. 9; Related Information: Journal Publication Date: May 1, 2009; http://www.osti.gov/scitech/servlets/purl/962720.

Waterfront Product Information, Geogard SX—Amorphous Silica Control, 2014, http://www.wateradditives.com/components/com_jshopping/files/demo_products/Geogard_SX_GP_WF.pdf.

Frenier, et al., Use of Highly Acid-Soluble Chelating Agents in Well Stimulation Services, SPE Annual Technical Conference and Exhibition, Oct. 1-4, 2000, Dallas, Texas, https://www.onepetro.org/conference-paper/SPE-63242-MS.

Civan et al., Rigorous Modeling of Gas Transport in Nano-darcy Shale Porous Media under Extreme Pore Proximity and Elevated Pressure Conditions, Proceedings of the International Conference on Heat Transfer and Fluid Flow, Prague, Czech Republic, Aug. 11-12, 2014, Paper No. 208, http://avestia.com/HTFF2014_Proceedings/papers/208.pdf.

Deglint, H.J., et al., "Live Imaging of Micro-Wettability Experiments Performed for Low-Permeability Oil Reservoirs", Scientific Reports, www.nature.com/scientificreports, 7:3247; DOI:10.1038/s41598-017-04239-x; pp. 1-13, Jun. 28, 2017.

Solomon, S. and T. Flach, "Carbon dioxide ($CO_2$) injection processes and technology", Abstract from Chapter 14.5.1 Permeability in Developments and Innovation in Carbon Dioxide ($CO_2$) Capture and Storage, 2010.

Kuuskraa, V., "Unconventional Natural Gas" Abstract from Advances in Energy Systems and Technology, V. 3, 1982.

Geiver, The Slickwater Story, The Bakken magazine, http://thebakken.com/articles/711/the-slickwater-story, Jul. 14, 2014, 2pgs.

Huang R.Y.M.; Jarvis, N.R. 1973. Ionically crosslinked hydrophilic polymer membranes: Synthesis and measurement of transport properties, J Polym Sci 41: 117-127, 11 pgs.

Ahmed, E.M. 2015. Hydrogel: Preparation, characterization, and applications: A review, J Adv Res 6: 105-121, 17pgs.

Akin, H.; Hasirci, V.N.; Hasirci, N. 1990. Permeability properties of charged hydrogel-carrying membranes, Polymer 31(2): 270-275, 6pgs.

Zendehboudi, S., and Alireza Bahadori, "Shale Gas Production Technologies", Abstract from Chapter 4.1 Artificial Well Stimulation, Shale Oil and Gas Handbook, 2017.

Halliburton, "Unconventional Well Testing", https://www.halliburton.com/en-US/ps/testing-subsea/reservoir-testing-analysis/data-aquisition/spidr/low-permeability-wells.html (2019).

(56) References Cited

OTHER PUBLICATIONS

International Search Report and Written Opinion dated Feb. 4, 2021 in corresponding International Application No. PCT/US2020/055035.

* cited by examiner

METHOD FOR REMEDIATION OF SUBTERRANEAN-FORMED METAL-POLYMER COMPLEXES USING PERACETIC ACID

RELATED APPLICATIONS

This application claims the benefit of U.S. Provisional Application No. 62/913,635 filed Oct. 10, 2019, which is herein incorporated by reference in its entirety.

INTRODUCTION

The darcy is a unit of permeability for fluids in a porous material. Nano-darcy shale formations refer to those shale formations having an average permeability in at least one direction of less than 1 micro-darcy or less than $1 \times 10^{-6}$ darcy. In nano-darcy shale formations, the range of average pore sizes within the shale spans the size of the hydrocarbons trapped in the shale, e.g., the natural gas molecules and the molecules of the various crude oil constituents. That is, the average pore size within the shale may be smaller, approximately the same size or larger than the size of the hydrocarbons. This differs from higher permeability shale formations in which the average pore sizes are substantially larger than the various hydrocarbon molecule sizes.

While permeability is a useful measurement, the determination of average pore size from a permeability measurement relies on assumptions about the shapes of the grains or pores in the subsurface. Shale formations are a mixture of clay minerals and larger particles. Clay minerals are not normally spherically shaped and also exhibit electro-static properties not found in non-clay materials. Thus, as nano-darcy shale formations are typically very high in clay content, they do not exhibit the same behaviors as more permeable formations, even more permeable shale formations.

Well stimulation refers to the treatment of an existing well to increase its recovery of hydrocarbons or other substances from the subsurface. Because of the different nature of nano-darcy shale formations, typical well stimulation techniques have been found to be ineffective or much less effective than in higher permeability formations.

An extreme form of well stimulation is referred to as hydraulic fracturing. Hydraulic fracturing of oil and gas wells is conducted by pumping fluids at high pressures and high velocities through a vertical and, usually, a horizontal section of a well. The well contains a well casing and, in some wells, tubing inside the casing. Perforations or ports in the casing are adjacent to targeted intervals of subterranean formations containing a hydrocarbon or target product. In hydraulic fracturing, the pressure exerted on the formation is greater than the pressure required to substantially fracture the formation, a pressure referred to as the fracture pressure of the formation which is a function of the formation' properties and the depth where the fractures are desired. One test for determining the fracture pressure is the Leak-off test. Applying a pressure equal to or greater than the fracture pressure causes the formation to fracture, creating an extensive fracture network.

After the fractures or cracks are initiated, pumping is continued, allowing the fractures to propagate. Once the fracture has gained sufficient fracture width, a proppant such as sand is added to the fluid and is transported into the fracture system, partially filling the fracture network. After the desired amount of proppant is placed in the fractures, additional water-based fluid is pumped to flush the casing of any proppant that may have settled in the casing. On completion of the fracturing process, the well is opened, allowing a portion of the fracturing fluids to be recovered. As the pressure is relieved, the fracture closes onto the proppant, creating a conductive pathway needed to accelerate oil and gas recovery from the formation. Hydraulic fracturing is expensive because of the large amounts of fluids and high pressures involved.

SUMMARY

This disclosure describes methods for remediating subterranean-formed metal-polymer complexes, such as polyacrylamide or other gelable polymers that crosslink with metal ions, from wells in subterranean formations, including wells in nano-darcy shale formations. These methods utilize a peracetic acid remediation mixture. In one embodiment, the method includes injecting a remediation mixture containing peracetic acid into a subterranean formation adjacent to a well at a pressure below the fracture pressure of the formation. A sufficient contact time is allowed and then the peracetic acid remediation mixture is pumped from the subsurface. This has been shown to remediate subterranean-formed polyacrylamide metal-polymer complexes in subterranean formations. Without being held to a particular theory, based on an analysis of samples of polyacrylamide metal-polymer complexes, it appears that the peracetic acid degrades the metal-polymer complexes and in doing so dissolves and/or disperses the metal-polymer complexes. These metal-polymer complexes have formed by cross-links between the cations and the polymers used in the fracturing fluids. In degrading the polyacrylamide metal-polymer complexes, the peracetic acid remediation mixture dissolves and/or disperses the metal-polymer complex. The metal-polymer complexes plug the passages in the formations which prevents removal of hydrocarbons. Degrading the metal-polymer complex causes the metal-polymer complex to go into a solution and/or at least to disperse so that it can be pumped to the surface, which removes the blockages and thereby causes increased production.

In one aspect, a method for remediating a subterranean-formed metal-polymer complex in a well in a subterranean formation is disclosed. The method includes providing a peracetic acid mixture containing about 0.05% to 50% by weight peracetic acid, injecting the peracetic acid remediation mixture into the well at a pressure less than a fracture pressure of the formation until at least some of the metal-polymer complex remediation mixture contacts the subterranean-formed metal-polymer complex, maintaining the peracetic acid remediation mixture in contact with the subterranean-formed metal-polymer complex for a contact time of between about 1 minute and about 100 days, thereby allowing the peracetic acid to cause the subterranean-formed metal-polymer complex to be degraded and dissolve and/or disperse, thereby creating a low viscosity flow back fluid; and removing the low viscosity flow back fluid from the well after the contact time, thereby improving the hydrocarbon production of the well relative to the hydrocarbon production immediately prior to performance of the method. In one embodiment, the peracetic acid mixture can contain about 0.3% to 40% by weight peracetic acid.

In another aspect, a method for remediating a low-producing well in a subterranean formation is disclosed. The example method can include fracturing the subterranean formation to produce a well, monitoring the production of the well, and after observing the well production decrease, determining that a subterranean-formed metal-polymer complex has formed in the well. A peracetic acid remediation mixture is provided containing about 0.05% to 50% by weight peracetic acid. The peracetic acid remediation mixture is injected into the well at a pressure less than a fracture pressure of the formation until at least some of the peracetic acid remediation mixture contacts the subterranean-formed metal-polymer complex. After injection, the peracetic acid remediation mixture is maintained in contact with the subterranean-formed metal-polymer complex for a contact time of between about 1 minute and about 100 days, thereby allowing the peracetic acid to cause the subterranean-formed metal-polymer complex to degrade and disperse and/or dissolve, thereby creating a low viscosity flow back fluid. The low viscosity flow back fluid is then removed from the well after the contact time, thereby improving the hydrocarbon production of the well relative to the hydrocarbon production immediately prior to performance of the method. In one embodiment, the peracetic acid mixture can contain about 0.3% to 40% by weight peracetic acid.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the disclosure as claimed.

BRIEF DESCRIPTION OF THE DRAWINGS

The following drawing figures, which form a part of this application, are illustrative of described technology and are not meant to limit the scope of the disclosure as claimed in any manner, which scope shall be based on the claims appended hereto.

DETAILED DESCRIPTION

Figure 1:
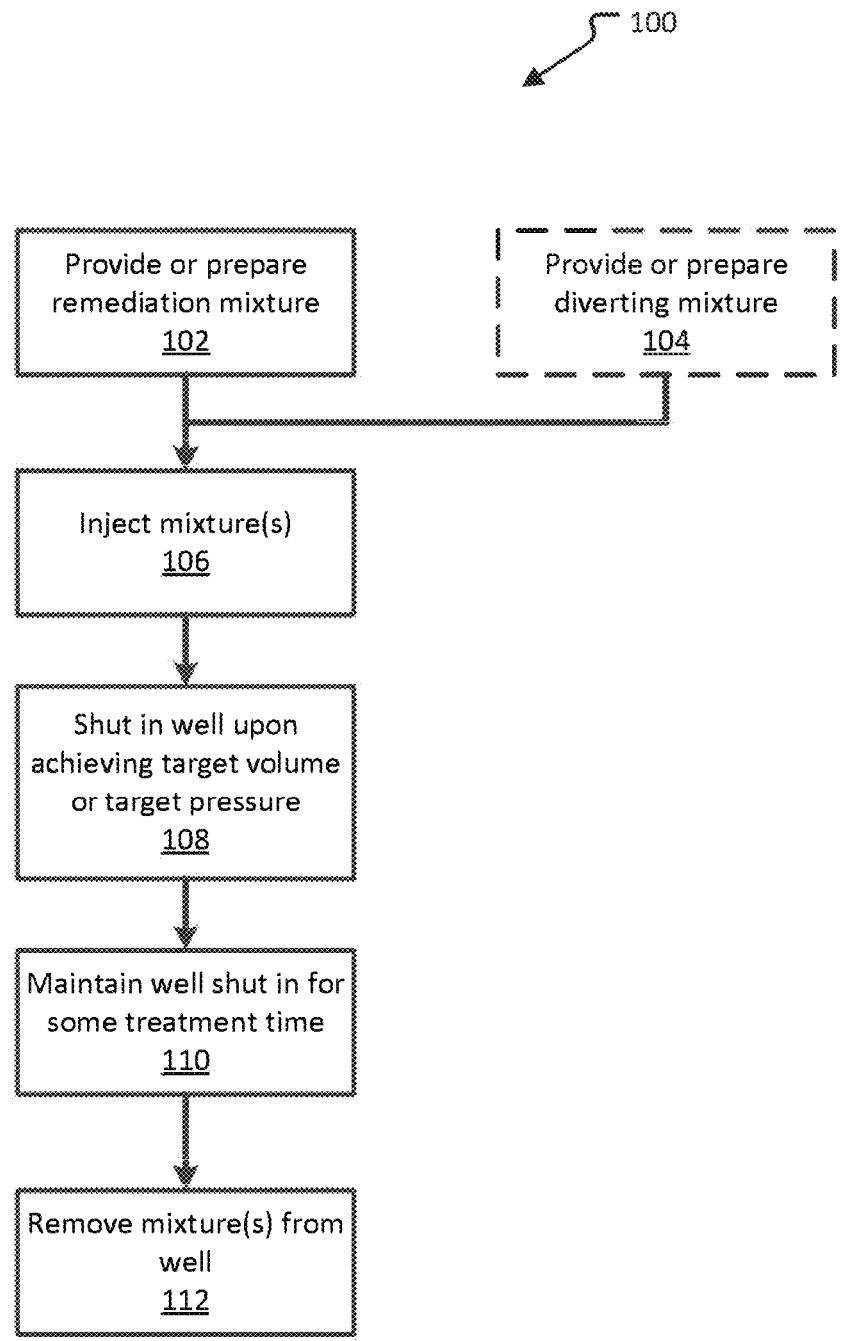
FIG. 1 is an embodiment of a method of remediating a subterranean-formed metal-polymer complex.

Although the techniques introduced above and discussed in detail below may be implemented for remediating subterranean-formed metal-polymer complexes from subterranean formations, the present disclosure will discuss the implementation of these techniques in an oil and gas well for the purpose of extracting hydrocarbons. The reader will understand that the technology described in the context of an oil and gas well could be adapted for use with other systems such as water well and solution mining wells.

This disclosure describes methods for remediating subterranean-formed metal-polymer complexes with residual polymers such as polyacrylamide or other gelable polymer that forms crosslinks or complexes with metals or metal complexes such as ferric hydroxide within the formation. Following the introduction of a hydraulic fracturing fluid, including slickwater, where high volumes of polymers such as polyacrylamide are used as friction reducers, into a well bore, over time the well production can decrease. Previously, well operators assumed that the flow reduction was attributable to the diminishing reserve of hydrocarbons in the subterranean formation. In many instances, this is not the sole reason for the observed flow reduction. Without being bound to a particular theory, the observed flow reduction can be attributed to a build-up of metal-polymer complex in the well bore that was formed after the well was created. The build-up of the metal-polymer complex may be in the subterranean formation near the well bore, within the subterranean formation farther from the well bore and the well bore environment, and/or deep within the subterranean formation. The methods disclosed herein address metal-polymer complexes no matter the location within the subterranean formation.

Again, without being bound to a particular theory, when fracturing fluid containing a polymer, such as polyacrylamide, is pumped into subterranean formations, the polymer can cross-link with metals present or introduced in the subterranean formations and form metal-polymer complexes. The metal-polymer complex may form a physical block in the subterranean formations, plugging up the conductive pathways formed during the fracturing process. These plugs are within the subterranean formation and may be near the well bore or the well bore environment or may be deep within the subterranean formation farther from the well bore. The build-up or plugs of metal-polymer complex can be removed by degrading or dissociating the metal-polymer complexes.

It has been unexpectedly discovered that peracetic acid mixtures or solutions can be used to degrade and dissolve and/or disperse the metal-polymer complexes, and thus, can improve and/or restore hydrocarbon production. The peracetic acid remediation mixture disclosed herein degrades the metal-polymer complexes, and when degraded by the peracetic acid remediation mixture, the metal-polymer complexes are dissolved or dispersed. Accordingly, the peracetic acid remediation mixtures disclosed herein remove the metal-polymer complexes and can improve and/or restore hydrocarbon production. Without being bound to a particular theory, the peracetic acid remediation mixtures may act upon the metal-polymer complexes through an oxidative process.

Peracetic acid as used herein is the organic carboxylic acid $CH_3CO_3H$. Peracetic acid is also known as peroxyacetic acid or PAA. Peracetic acid is a strong oxidizing agent or oxidizer. Without being bound to a particular theory, the peracetic acid remediation mixture disclosed herein may oxidize, degrade, and dissolve the metal-polymer complexes, removing the build-up of the metal-polymer complexes.

Peracetic acid in water solutions are used herein. Peracetic acid is typically available in solution as a mixture with acetic acid and hydrogen peroxide to maintain its stability. The concentration of the peracetic acid as the active ingredient can vary. Commercial preparations of PAA also contain hydrogen peroxide ($H_2O_2$) and acetic acid to stabilize the solution. The peracetic acid solutions typically contain about 0.3% to 40% by weight peracetic acid.

Examples of peracetic acid solutions can contain peracetic acid 12-15%; hydrogen peroxide 18.5-23%, inert ingredients of acetic acid ~18% and water ~51%.

Examples of commercially available PAA include Proxitane 1507 (15% peracetic acid, ~28% acetic acid, 14% hydrogen peroxide, ~1% stabilizer, and 43% water) and Proxitane AHC (~5% peracetic acid, 19% (min) hydrogen peroxide, and 10% acetic acid).

These commercially available peracetic acid solutions may be used as such or combined with further solvent and optional additives to provide the remediation mixture of the present disclosure. In some embodiments this further solvent may be water or an aqueous based solvent.

In one embodiment, the method includes injecting a remediation mixture containing peracetic acid into a well at a pressure below the fracture pressure of the formation where a metal-polymer complex is presumed or known to have formed. A sufficient contact time is allowed and then the peracetic acid remediation mixture is pumped from the subsurface. The peracetic acid remediation mixture has been shown to degrade metal-polymer complexes obtained from nano-darcy shale formations, which can result in a liquid with similar viscosity and rheological properties as water. Without being held to a particular theory, it appears that the peracetic acid degrades the metal-polymer complex and causes it to dissociate and dissolve. The peracetic acid is acting upon the metal-polymer complex to degrade it and dissolve and/or disperse it. Without being bound to a particular theory, this may be through an oxidative process. These metal polymer complexes are formed from metal ions naturally present in the subterranean formations crosslinking with polymers present in the fracturing fluids introduced into the subterranean formations.

The present disclosure relates to a process to cause the degradation and dissociation of metal cations and metal complexes from the metal-polymer complexes created in wells as a byproduct of the fracturing process. The use of peracetic acid to degrade and dissolve and/or disperse materials that are, or can, restrict flow into the well bore is presented as a commercial method to restore or enhance the productivity of well bores that are restricted with such materials. For example, the introduction of hydraulic fracturing fluids containing, for example, polymers and acrylates including polymers used as friction reducers, such as polyacrylamide, can form metal-polymer complexes between the polymer and the metal ions, such as aluminum, barium, calcium, magnesium, manganese, iron, strontium, boron and other metals or metalloids, which are naturally present within the subterranean formations. These metal-polymer complexes do not exist naturally. Rather, they can form as a result of the fracturing process and the materials used in the fracturing process. The metal-polymer complexes are within the subterranean formation and may be near the well bore or the well bore environment or within the subterranean formation farther from the well bore and the well bore environment.

In one embodiment, the peracetic acid is provided in an amount of about 0.05% weight to about 50% weight. However, any suitable range may be used including from about 0.3% to about 40% weight; from about 0.5% to about 20% weight; from about 1% and about 40% weight; from about 1% to about 25% weight; from about 1% to about 20% weight; from about 1% to about 15% weight; from about 1% to about 10% weight; and about 15% weight. The peracetic acid remediation mixture also comprises water and may also comprise acetic acid and/or hydrogen peroxide.

The remediation mixture as disclosed herein contains peracetic acid, and may also contain multiple chemical additives as desired. These additives may include biocide, scale inhibitor, clay control additive, oxygen scavenger and surfactant that assist fluid recovery. To keep the fracturing treatments affordable, only minimal amounts of these additives are used. Each additive is normally liquid-based and is metered separately into the treatment fluid and mixed with water and other additives in the blender. The blender includes a 5- to 15-barrel tub with agitation devices. The additive concentrations are commonly expressed in parts per million (ppm) or as gallons of additive per 1000 gallons of water (abbreviated as gallons per thousand or gpt). The additives typically are composed of a chemical that provides the desired function such as scale inhibition and a solvent, commonly water, alcohol or oil.

Another additive that may be used is a corrosion inhibitor. Corrosion inhibitors reduce corrosion of the well components. In an embodiment, quaternary ammonium compounds typically referred to as quaternary amines are used as a corrosion inhibitor in trace amounts to 2,000 ppm. However, any suitable corrosion inhibitor may be used in any amount as desired. Other examples of possible corrosion inhibitors include quaternary amine compounds commonly used for protection of metal in the presence of high or low pH and/or dissolved oxygen bearing fluids, such as Flex-Chem FC-181 and many other similar formulations used in well maintenance activities. Quaternary ammonium compounds, acetylenic alcohols, amide and oxylalkylated alcohols, quinoline quaternary ammonium alkyl amine salts and surfactants, nonyl phenol surfactants, alkyl thioamides, oxyalkylated phenols, alkyl pyridine benzyl quaternary ammonium chloride, benzyl quaternary ammonium chloride, aliphatic amines, cocoamine diquaternary ammonium chloride, imadazoline, polyamide, modified amido polyamine, alkylamidomine, amido imadazoline, alkyl phosphate ester, potassium salt of a glycol phosphate ester, amine salt of poly-phosphate ester, tallow diamine ethoxylate, polyacid, amine salt of polyphosphonic acid, organic acid-amine salt, crude dimerized fatty acids or tall oil dimer-trimer acids.

Another additive that may be used is a surfactant. Surfactants such as sodium lauryl sulfate and many other surfactant materials that could be selected based on their compatibility with the other materials in the chelating solution and pH of the final solution can be used.

Another additive that may be used is a biocide. For example, in an embodiment trace amounts to 5,000 ppm tributyl tetradecyl phosphonium chloride (TTPC) may be used as a biocide. Any suitable biocide may be used in any amount as desired. Biocidal agents could include, glutaraldehyde, quaternary amine compounds such as alkyl dimethyl benzyl ammonium chloride (ADBAC), sodium chlorite (which would generate chlorine dioxide in-situ), TTPC, isothiazolin compounds, thione based compounds, and many other agents approved for use in the well maintenance activities. Other examples of possible biocides include chlorine dioxide, didecyldimethyl ammonium chloride (DDAC) and brominated propionamide.

Another additive that may be used is a dispersing agent. Dispersing agents such as Dow Acumer 5000 or Versaflex Si to enhance the removal of colloidal silicon bearing materials and many other dispersing agents that could assist with recovering colloidal material residue from the well bore.

Another additive that may be used is a colloidal silica deposition inhibitor. The use of a colloidal silica deposition inhibitor, sometimes also referred to as amorphous silica control compound, prevents silica scale precipitation within the wells during the treatment process. One example of a colloidal silica deposition inhibitor is an aqueous solution of organic additive based on phosphino carboxylic acid copolymer. Any suitable colloidal silica deposition inhibitor may be used. Other examples of possible colloidal silica deposition inhibitors include such materials as phosphate, phosphate ester, or phosphonate compounds; polymaleic, or acrylate compounds such as polyacrylic acid scale inhibitors commonly used for such applications in well maintenance activities.

Another additive that may be used is a mutual solvent. Mutual solvents are soluble in oil, water and acid-based mixtures and may be used in a range of applications, such as removing heavy hydrocarbon deposits, controlling the wettability of contact surfaces before, during or after a stimulation treatment, and preventing or breaking emulsions. A commonly used mutual solvent is ethylene glycol monobutyl ether, generally known as EGMBE or 2-butoxy ethanol. Any suitable mutual solvent may be used. Other examples of possible mutual solvents include compounds such as ethylene glycol monobutyl ether or FCS-280 or other compounds commonly used for such applications in well maintenance activities.

In addition to the peracetic acid, the remediation mixture as disclosed herein may also contain acetic acid and/or hydrogen peroxide.

In certain embodiments, the peracetic remediation mixture may comprise a mutual solvent and an additive selected from the group consisting of corrosion inhibitor, scale inhibitor, clay control additive, surfactant, biocide, and mixtures thereof.

In some wells, metal-polymer complex remediation using the novel remediation mixtures designed herein may be made more cost efficient by alternating the injection of the remediation mixture with the injection of a diverting mixture. In some embodiments, the diverting mixture may be injected as a separate stage. Many wells have high volume sections within the well flow paths that are referred to as fluid thief zones in that they represent a volume that must be filled during the treatment process but the fluid in that zone is ineffective at its task (in this case complexing with metal cations in the subterranean formation). To address this, a diverting mixture, such as particles of polylactic acid in a brine solvent to form a diverting mixture, may be used. Diverting mixtures are well known to those of skill in the art and are designed to take up larger volumes without interfering with the delivery of treatment chemicals to the target zones. Diverting mixtures are relatively inert with respect to the treatment chemicals and are also designed to allow easy passage of the treatment chemicals around volumes that they occupy. In addition, many diverting mixtures are designed to breakdown and be easily recoverable after some period of time such as days or weeks. In the methods as disclosed herein, the diverting mixture, if utilized, should be chosen to be compatible with the peracetic acid remediation mixture.

Diverting mixtures other than particles of polylactic acid in a brine mixture may also be used. Diverting agents or materials such as benzoic acid flakes, polylactic acid, solid or water soluble ball sealers, rock salt, encapsulated solid chelators, etc., may be used as diverting agents and form diverting mixtures when mixed with a suitable solvent, such as a water based solvent. However, if utilized, the diverting mixture should be chosen to be compatible with the peracetic acid remediation mixture and keeping in mind that the diverting mixture may be injected in a separate stage or alternating stages. A person skilled in the art readily can decide how to perform the injection. In some embodiments in which utilized, the diverting mixtures are injected in a separate stage. For example, mixtures using products consisting of various polymers blended with waxes and other solid hydrocarbons polymers blended with waxes and other solid hydrocarbons have been used as a diverting mixture when mixed with a suitable solvent. Diverting mixtures are designed to be relatively inert with respect to the treatment chemicals and are also designed to allow easy passage of the treatment chemicals.

In an embodiment, a metal-polymer complex remediation program may include alternating between injecting an amount of remediation mixture, followed by injecting an amount of a diverting mixture until such time as the well pressure achieves a target pressure, such as a pre-determined target pressure, the fracture pressure for the formation or a threshold amount above or below the pre-determined fracture pressure from the formation calculated based on the fracture pressure. In some embodiments, the diverting mixtures may be injected in a separate stage, followed by injection of the peracetic acid remediation mixture.

In another embodiment, the methods may include injecting an amount of remediation mixture until such time as a target volume is achieved.

FIG. 1 illustrates one such metal-polymer complex remediation program. In the program 100, the peracetic acid remediation mixture is obtained in a provide remediation mixture operation 102. The peracetic acid remediation mixture may be made or completed on site in a batch process or an amount of peracetic acid remediation mixture may be brought to the site prior to the metal-polymer complex remediation of the well. Any of the embodiments of the remediation mixture described above may be used.

In some embodiments, providing or preparing a diverting mixture operation 104 is also performed in which a diverting mixture is either generated at the site prior to use or a mixture is brought to the site pre-made. Any diverting mixture as described above may be used if the diverting mixture us compatible with the peracetic acid remediation mixture. This operation, 104, is optional and may not be needed if it is determined that there will be relatively little loses to thief zones of the remediation mixture during the treatment process.

Next, the remediation mixture and the diverting mixture (if any) are injected in an injection operation 106. In an embodiment, the two mixtures are alternately injected in alternating injection operation 106. As described above, predetermined amounts or volumes of the mixtures may be alternately injected or the injection amounts may be varied. In an embodiment, for example, the injection operation alternately injects 150 barrels of remediation mixture and 150 barrels of diverting mixture.

In one embodiment, injection continues until such time as the well pressure achieves a target pressure. The target pressure may be a pre-determined target pressure based on knowledge of the operator. Alternatively, the target pressure may be the fracture pressure for the formation or a threshold amount above or below the fracture pressure from the formation. Any suitable technique such as the Leak-off test may be used to determine fracture pressure.

In another embodiment, injection continues until such time as a target volume of the peracetic acid remediation mixture is injected. A target volume of peracetic acid remediation mixture may be from about 100 bbl to about 3,500 bbl. In other embodiments the target volume of peracetic acid remediation mixture may be about 1 bbl to about 100,000 bbl. In further embodiments, the target volume of remediation mixture may be about 500 bbl to about 1,500 bbl. For purposes of clarity, 1 bbl is 158.99 L.

Upon reaching the target pressure or target volume, a well shut in operation 108 is performed. In the shut in operation

108, the well is closed and the peracetic acid remediation mixture is trapped in the well.

The well is then maintained in the shut in state in a maintain shut in operation 110. This provides contact time for the remediation mixture allowing the peracetic acid to react with the subterranean-formed metal-polymer complex, thereby allowing the metal-polymer complex to degrade and dissolve into the treatment mixture. During this period, the pressure may slowly decrease and the pH may change due to reactions occurring in the subsurface. During this period, pH and/or pressure may be monitored and the removal operation can be based on results of the monitoring operation.

The contact time provided may be any amount from 1 minute to 100 days. In certain embodiments, the contact time may be about 4 hours to about 4 days. However, it appears that a contact time of 1 to 4 days may be preferable. Too long or short a contact time may result in lowered performance. Too short a time may not allow sufficient time for the remediation mixture to cause the degradation of the metal-polymer complex. Too long a contact time may result in metals precipitating within the well or formation before they can be removed with the spent remediation mixture. It is anticipated that the optimum time may need to be determined empirically for each fracturing fluid chemistry and formation combination or even each depth or region of a formation.

The method ends with the extraction of the spent remediation mixture along with the degraded and dissolved or dispersed metal-polymer complex constituents in a mixture removal operation 112. In the removal operation 112, the well is opened and the liquid in the well is pumped out of the well. The constituents removed will include metals from the subsurface, constituents of the spent remediation treatment mixture. Without being held to a particular theory, the peracetic acid remediation mixture degrades the metal-polymer complex and allows it to be pumped out of the well.

Other embodiments of the method 100 are possible. In addition to changing any of the specific components of the mixtures as described above, changes to when and how the mixtures are produced and injected may be made without departing from the teaching of this disclosure.

Figure 5:
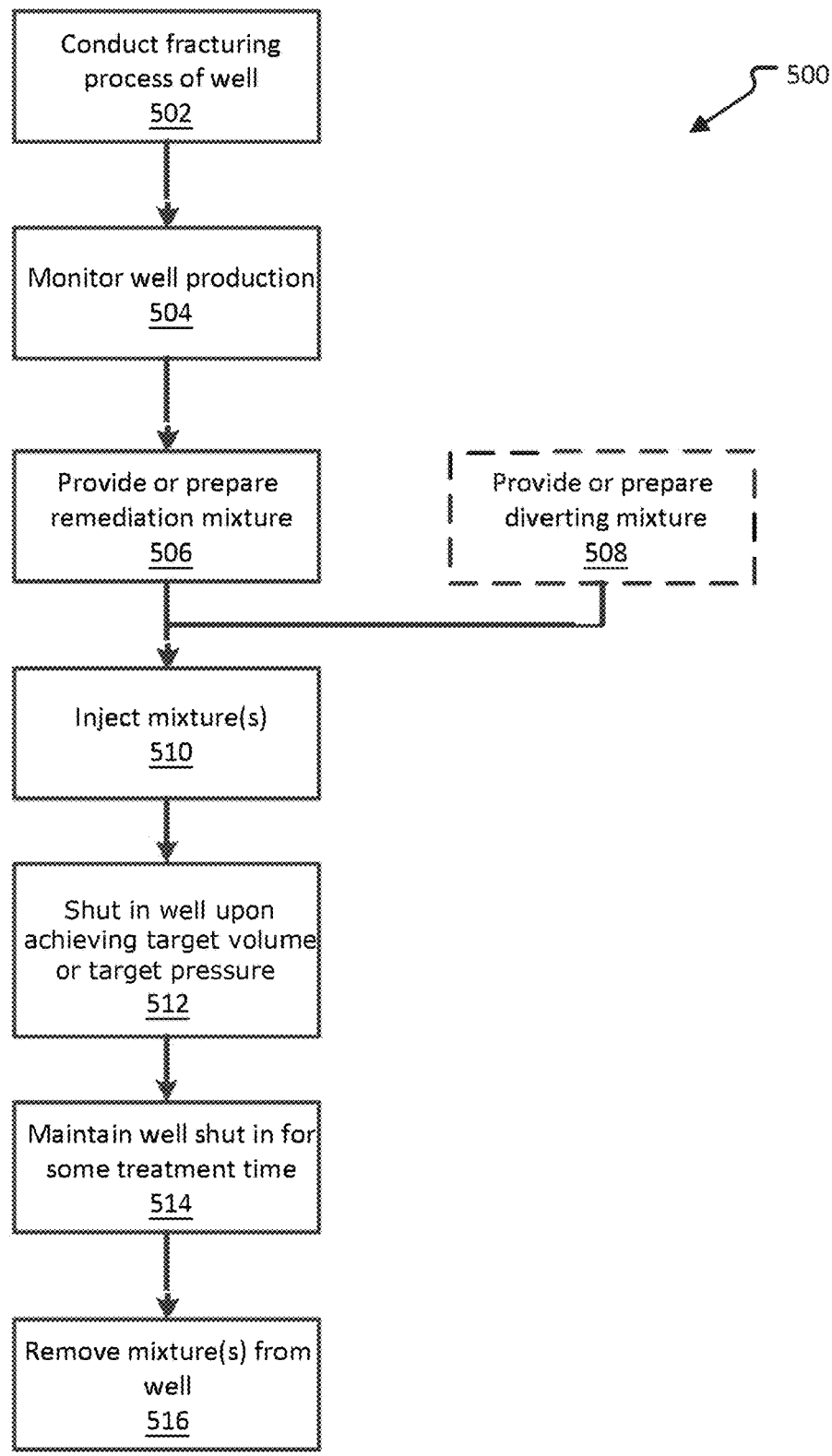
FIG. 5 is an embodiment of a method of remediating a low-producing well.

FIG. 5 illustrates a low-producing well remediation program 500. In some instances, a well becomes low-producing as compared to the initial hydrocarbon production. Without actually testing the well to verify a metal-polymer complex is blocking hydrocarbon flow, there might be a presumption that metal-polymer complex was formed in the well. Nonetheless, remediation mixtures according to the instant disclosure can be employed to improve hydrocarbon production without confirmation that a subterranean-formed metal-polymer complex is the cause of the low hydrocarbon production. Embodiments of this method may be usable with any fractured well regardless of the permeability of the formation. However, such embodiment may be more suitable for low permeability formations such as nano-darcy formations as the development of a metal-polymer complex will have a greater impact in a low permeability formation than in a higher permeability formation.

In the example program 500, a well is fractured using fracturing fluid in a conduct fracturing process operation 502. This process is performed according to various methods known in the art. In embodiments, the well production output is monitored in operation 504. Monitoring output can include hourly, daily, weekly, monthly, and yearly hydrocarbon output from the well. It can be performed manually or automatically. If the well production decreases, then a remediation of the well can be performed using a remediation mixture as disclosed herein. The monitoring operation 504 may include periodic sampling from the well to determine the existence of a subterranean-formed metal-polymer complex. Determination of a metal-polymer complex in this embodiment is direct observation of the metal-polymer complex such as by obtaining some amount of material from the well (e.g., via a bailer, by a downhole inspection technique, or from the flowback). If a decrease in well production is observed in tandem with the existence of a subterranean-formed metal-polymer complex or an increase in the amount of metal-polymer complex observed in the well, then it will be presumed that the metal-polymer complex is causing the production decrease. Alternatively, the monitoring operation 504 may only be a monitoring of the hydrocarbon production of the well, the flowback production of the well, the pressures needed to operate the well or some other indicator of well performance or of the hydraulic resistance within the well. In this embodiment, the observed decrease in performance in conjunction with the fact that a fracturing operation took place at the well is indirect evidence that a metal-polymer complex has formed and is causing the decrease in performance.

The peracetic acid remediation mixture is obtained and utilized to provide remediation mixture operation 506. The peracetic acid remediation mixture may be made or completed on site in a batch process or an amount of peracetic acid remediation mixture may be brought to the site prior to the metal-polymer complex remediation of the well. Any of the embodiments of the remediation mixture described above may be used.

In some embodiments, a provide or prepare diverting mixture operation 508 is also performed in which a diverting mixture is either generated at the site prior to use or a mixture is brought to the site pre-made. Any diverting mixture as described above may be used as long as the diverting mixture is compatible with the peracetic acid remediation mixture. This operation, 508, is optional and may not be needed if it is determined that there will be relatively little loses to thief zones of the remediation mixture during the treatment process.

Next, the peracetic acid remediation mixture and the diverting mixture (if any) are injected in an injection operation 510. In an embodiment, the two mixtures are alternately injected in alternating injection operation 510. As described above, predetermined amounts of the mixtures may be alternately injected or the injection amounts may be varied. In an embodiment, for example, the injection operation alternately injects 150 barrels of remediation mixture and 150 barrels of diverting mixture.

In one embodiment, injection continues until such time as the well pressure achieves a target pressure. The target pressure may be a pre-determined target pressure based on knowledge of the operator. Alternatively, the target pressure may be the fracture pressure for the formation or a threshold amount above or below the fracture pressure from the formation. Any suitable technique such as the Leak-off test may be used to determine fracture pressure. As such, the peracetic acid remediation mixture may be injected until pressure within the well reaches a predetermined target that does not cause substantial fracturing of the formation.

In other embodiments, injection continues until such time as a target volume of peracetic acid remediation mixture is injection.

Upon reaching the target pressure or target volume, a well shut in operation 512 is performed. In the shut in operation 512, the well is closed and the peracetic acid remediation mixture is trapped in the well.

The well is then maintained in the shut in state in a maintain shut in operation 514. This provides contact time for the remediation mixture, allowing the treatment chemicals to react with the presumed subterranean-formed metal-polymer complex, thereby allowing the metal-polymer complex to degrade and dissolve into the treatment mixture. During this period, the pressure may slowly decrease and the pH may change due to reactions occurring in the subsurface. The contact time provided may be any amount from 1 minute to 100 days. In certain embodiments, the contact time may be about 4 hours to about 4 days. However, it appears that 1 to 4 days may be preferable. Too long or short a contact time may result in lowered performance. Too short a time may not allow sufficient time for the remediation mixture to cause degradation of the metal-polymer complex. Too long a contact time may result in metals precipitating within the well or formation before they can be removed with the spent remediation mixture. It is anticipated that the optimum time may need to be determined empirically for each fracturing fluid chemistry and formation combination or even each depth or region of a formation.

The method ends with the extraction of the spent remediation mixture along with the degraded and dissolved metal-polymer complex constituents in a mixture removal operation 516. In the removal operation 516, the well is opened and the liquid in the well is pumped out of the well. The constituents removed may include metals and spent treatment mixture. Without being held to a particular theory, the peracetic acid remediation mixture degrades the metal-polymer complex and allows it dissolve or become less viscous so that it can be pumped out of the well.

Other embodiments of the method 500 are possible. In addition to changing any of the specific components of the mixtures as described above, changes to when and how the mixtures are produced and injected may be made without departing from the teaching of this disclosure.

EXAMPLES

The following Examples are meant to be illustrative and are non-limiting.

Example 1

Sample 1 was an unknown gel-like substance assumed to contain gel/polymer residue. The objective of the test of Example 1 was to determine properties of the sample and develop a treatment to break down the gel and enhance the removal of downhole gel residue deposits, such as those similar to sample 1.

A piece approximately 6 grams of sample 1 was tested. Sample 1 was treated with a 15% PAA solution (commercial preparation with 15% PAA/10% $H_2O_2$; acetic acid and hydrogen peroxide stabilize commercial preparations).

Figure 2:
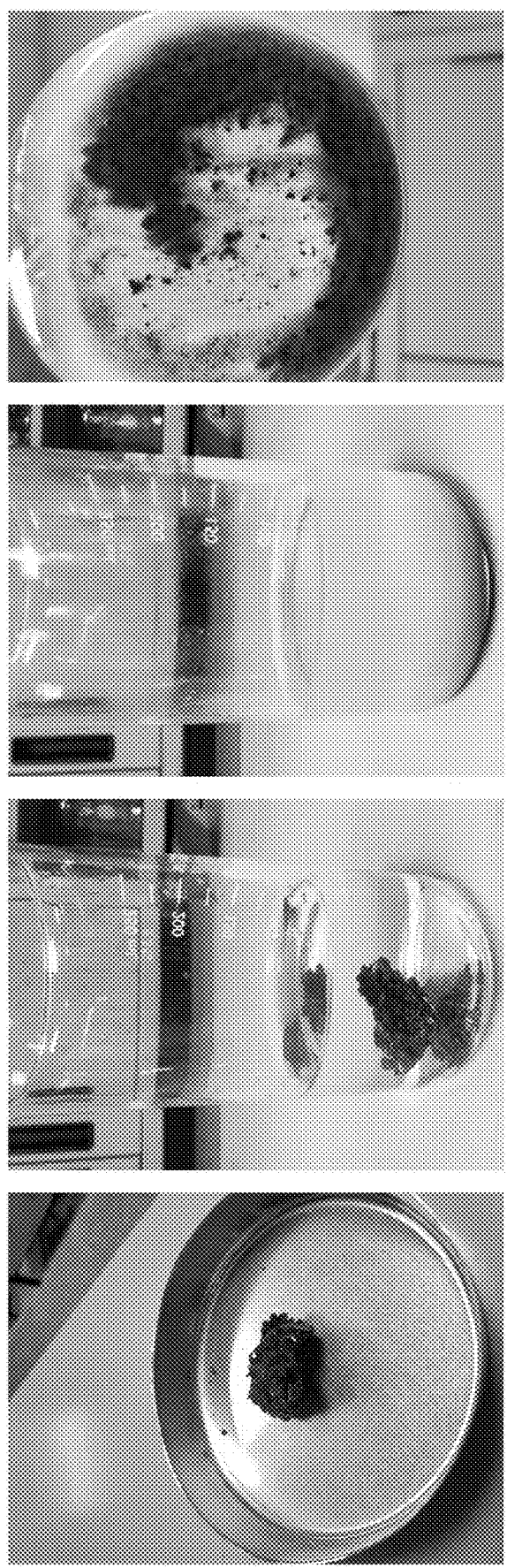
FIG. 2 illustrates sample 1 before, during, and after the treatment process as described in Example 1.

Sample 1 treated with the 15% PAA solution was observed after four hours—the sample broke apart into small dispersed particles of soft consistency. The results after four hours are shown in FIG. 2.

Example 2

Sample 2 was an unknown flexible semisolid gel-like material assumed to contain gel/polymer residue. The objective of the test of Example 2 was to determine properties of the sample and develop a treatment to break down the gel and enhance the removal of downhole gel residue deposits, such as those similar to sample 2.

A piece approximately 4 grams of sample 2 was tested. Sample 2 was treated with a 15% PAA solution (commercial preparation).

Figure 3:
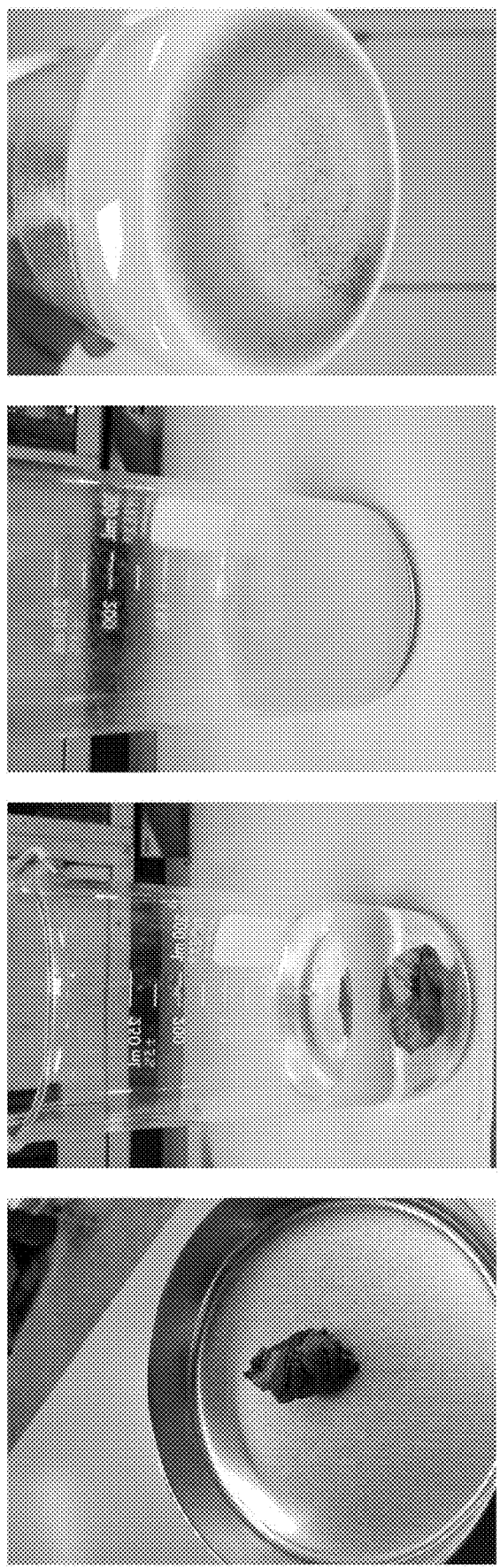
FIG. 3 illustrates sample 2 before, during, and after the treatment process as described in Example 2.

Sample 2 treated with 15% PAA solution was observed after four hours—the sample was degraded into soft fragments which dispersed in the treatment solution. The results after four hours are shown in FIG. 3.

Example 3

Sample 3 was a soft semisolid material substance assumed to contain gel/polymer residue. The objective of the test of Example 3 was to determine properties of the sample and develop a treatment to break down the gel and enhance the removal of downhole gel residue deposits, such as those similar to sample 3.

A piece approximately 2-3 grams of sample 3 was tested. Sample 3 was treated with a 15% PAA solution (commercial preparation).

Figure 4:
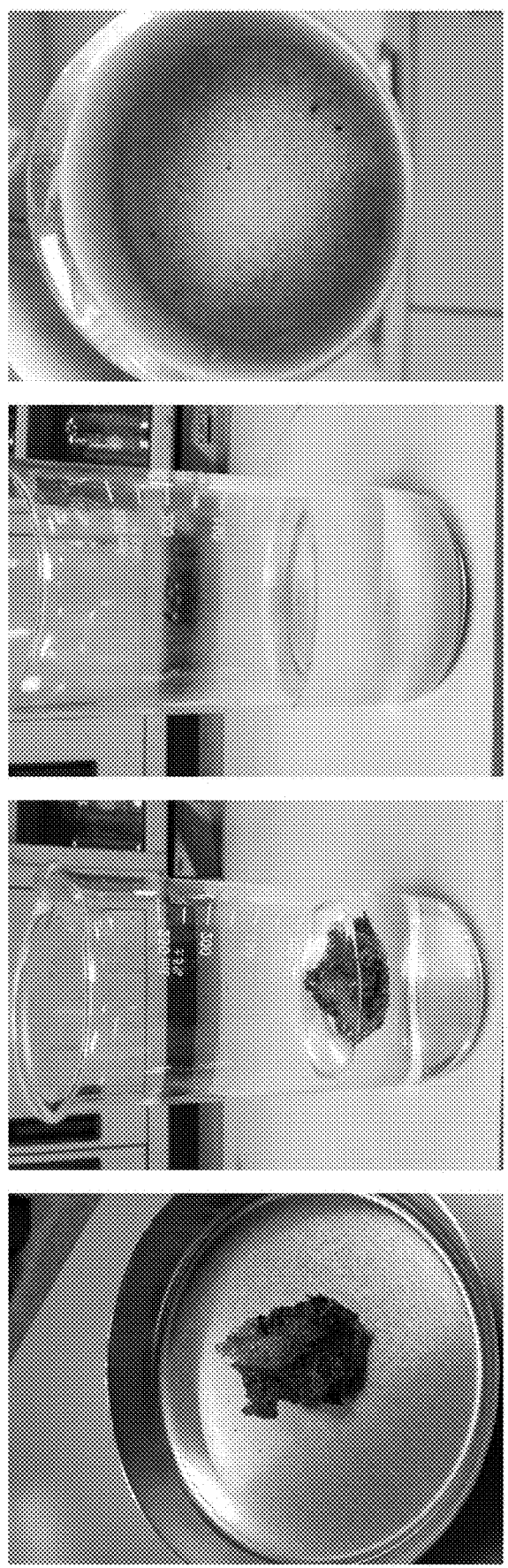
FIG. 4 illustrates sample 3 before, during and after the treatment process as described in Example 3.

Sample 3 treated with 15% PAA solution was observed after four hours—the sample broke apart into small particles of soft consistency which were dispersed in the treatment solution. The results after four hours are shown in FIG. 4.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussions regarding ranges and numerical data. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the present disclosure. Numerous other changes may be made which will readily suggest themselves to those skilled in the art and which are encompassed in the spirit of the disclosure.

What is claimed is:

1. A method for remediating a subterranean-formed metal-polymer complex in a pre-existing well in a subterranean shale formation, the method comprising steps of:
   providing a peracetic acid remediation mixture comprising about 0.05% to 50% by weight peracetic acid;
   injecting the peracetic acid remediation mixture into the well at a pressure less than a fracture pressure of the subterranean shale formation until at least some of the peracetic acid remediation mixture contacts the subterranean-formed metal-polymer complex, wherein the subterranean-formed metal polymer complex forms from a previously injected fracturing fluid and metal of the subterranean-formed metal-polymer complex includes metal naturally present within the subterranean shale formation;
   shutting the peracetic acid remediation mixture in the well upon achieving a target volume or target pressure;
   maintaining the peracetic acid remediation mixture in contact with the subterranean-formed metal-polymer complex for a contact time of between about 1 minute and about 100 days, thereby allowing the peracetic acid to cause the subterranean-formed metal-polymer complex to degrade and dissolve but not precipitate the metal and thereby creating a flow back fluid; and
   removing the flow back fluid from the well after the contact time, thereby improving hydrocarbon production of the well.

2. The method of claim 1, wherein the peracetic acid remediation mixture comprises about 0.3% to 40% by weight peracetic acid, one or more additives, and mutual solvent.

3. The method of claim 1, wherein the peracetic acid remediation mixture comprises approximately 15% by weight peracetic acid.

4. The method of claim 3, wherein the peracetic acid remediation mixture further comprises hydrogen peroxide and acetic acid.

5. The method of claim 1, wherein the peracetic acid remediation mixture further comprises a mutual solvent and an additive selected from the group consisting of corrosion inhibitor, scale inhibitor, clay control additive, surfactant, biocide, and mixtures thereof.

6. The method of claim 1, wherein the injecting step further comprises:
   injecting the peracetic acid remediation mixture until a target volume is injected; and
   upon reaching the target volume, shutting in the well.

7. The method of claim 1, wherein the injecting step further comprises:
   injecting the peracetic acid remediation mixture until pressure within the well reaches a predetermined target pressure calculated based on the fracture pressure of the subterranean formation; and
   upon reaching the target pressure, shutting in the well.

8. The method of claim 1 further comprising:
   monitoring at least one of pH and well pressure during the maintaining step; and
   initiating the removing step based on results of the monitoring step.

9. The method of claim 1, wherein the contact time is between about 4 hours and about 4 days.

10. The method of claim 9, wherein the contact time is between 1 to 4 days.

11. A method for remediating a subterranean-formed metal-polymer complex in an existing, low-producing well in a hydrocarbon-bearing subterranean shale formation, comprising steps of:
    observing a well production decrease;
    providing a peracetic acid remediation mixture containing about 0.05% to 50% by weight peracetic acid;
    injecting the peracetic acid remediation mixture into the well at a pressure less than a fracture pressure of the subterranean shale formation until at least some of the peracetic acid remediation mixture contacts the subterranean-formed metal-polymer complex, wherein the subterranean-formed metal polymer complex forms from a previously injected fracturing fluid and metal of the subterranean-formed metal-polymer complex includes metal naturally present within the subterranean shale formation;
    shutting the peracetic acid remediation mixture in the well upon achieving a target volume or target pressure;
    maintaining the peracetic acid remediation mixture in contact with the subterranean-formed metal-polymer complex for a contact time of between about 1 minute and about 100 days, thereby allowing the peracetic acid to cause the subterranean-formed metal-polymer complex to degrade and dissolve, thereby creating a flow back fluid; and
    removing the flow back fluid from the well after the contact time, thereby improving hydrocarbon production of the well.

12. The method of claim 11, wherein the peracetic acid remediation mixture comprises about 0.3% to 40% by weight peracetic acid.

13. The method of claim 11, wherein the injecting step further comprises:
    alternately injecting a first amount of peracetic acid remediation mixture and a second amount of a diverting mixture into the well.

14. The method of claim 13, wherein the contact time is between about 4 hours and about 4 days.

15. The method of claim 12, wherein the peracetic acid remediation mixture comprises approximately 15% by weight peracetic acid.

16. The method of claim 15, wherein the peracetic acid remediation mixture further comprises hydrogen peroxide and acetic acid.

17. A method for remediating an existing, low-producing well in a hydrocarbon-bearing subterranean shale formation, comprising steps of:
    fracturing the hydrocarbon-bearing subterranean shale formation with fracturing fluids containing polymers;
    producing hydrocarbons from the well;
    monitoring production of the well; and
    after observing a well production decrease, and before injecting any remediation mixtures into the well, determining that a subterranean-formed metal-polymer complex has formed in the well, metal of the subterranean-formed metal-polymer complex including metal naturally present within the subterranean shale formation complexed with polymers from the fracturing fluids;

providing a peracetic acid remediation mixture containing about 0.05% to 50% by weight metal peracetic acid;

injecting the peracetic acid remediation mixture into the well at a pressure less than a fracture pressure of the subterranean shale formation until at least some of the peracetic acid remediation mixture contacts the subterranean-formed metal-polymer complex;

shutting the peracetic acid remediation mixture in the well upon achieving a target volume or target pressure;

maintaining the peracetic acid remediation mixture in contact with the subterranean-formed metal-polymer complex for a contact time of between about 1 minute and about 100 days, thereby allowing the peracetic acid to cause the subterranean-formed metal-polymer complex to degrade and dissolve, thereby creating a flow back fluid; and removing the flow back fluid from the well after the contact time, thereby improving hydrocarbon production of the well.

18. The method of claim 17, wherein the contact time is between about 4 hours and about 4 days.

19. The method of claim 17, wherein the peracetic acid remediation mixture comprises approximately 15% by weight peracetic acid.

20. The method of claim 19, wherein the peracetic acid remediation mixture further comprises hydrogen peroxide and acetic acid.

* * * * *